United States Patent
Tsunoda

(10) Patent No.: US 9,641,746 B2
(45) Date of Patent: May 2, 2017

(54) IMAGE CAPTURING APPARATUS AND CONTROL METHOD FOR SELECTING FROM SUCCESSIVELY-CAPTURED IMAGES

(71) Applicant: KYOCERA Corporation, Kyoto-shi, Kyoto (JP)

(72) Inventor: Hiroshi Tsunoda, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/861,865

(22) Filed: Sep. 22, 2015

(65) Prior Publication Data

US 2016/0014331 A1 Jan. 14, 2016

Related U.S. Application Data

(63) Continuation of application No. PCT/JP2014/057861, filed on Mar. 20, 2014.

(30) Foreign Application Priority Data

Mar. 21, 2013 (JP) ................................. 2013-058799

(51) Int. Cl.
*H04N 5/232* (2006.01)
*G06F 3/0488* (2013.01)
(Continued)

(52) U.S. Cl.
CPC ....... *H04N 5/23216* (2013.01); *G06F 3/0485* (2013.01); *G06F 3/0488* (2013.01);
(Continued)

(58) Field of Classification Search
CPC .. G06F 3/0485; G06F 3/04855; G06F 3/0488; H04N 51/0044; H04N 1/2145;
(Continued)

(56) References Cited

U.S. PATENT DOCUMENTS

2003/0193602 A1* 10/2003 Satoh ................. H04N 1/00411
348/333.12
2004/0046887 A1* 3/2004 Ikehata ............... G06F 3/04883
348/333.12
(Continued)

FOREIGN PATENT DOCUMENTS

JP H11-27616 A 1/1999
JP 2000-122779 A 4/2000
(Continued)

OTHER PUBLICATIONS

Office Action dated Apr. 12, 2016, issued in counterpart Japanese Application No. 2013-058799.
(Continued)

*Primary Examiner* — Amy Hsu
(74) *Attorney, Agent, or Firm* — Procopio Cory Hargreaves and Savitch LLP

(57) ABSTRACT

A mobile phone includes a display, a capturing module configured to obtain a photographed image, a touch detection module configured to receive a touch operation, a main storage module and an auxiliary storage module, and a control module. The control module temporarily stores in the main storage module successively photographed images photographed at a predetermined time interval by the capturing module, and displays a postview screen for allowing a user to select a predetermined photographed image from a successively photographed image group stored in the main storage module when the touch detection module receives a touch operation with respect to a shutter icon. The control module stores a selected photographed image in the auxiliary storage module when the touch detection module receives a touch operation with respect to a photographed image.

9 Claims, 14 Drawing Sheets

(51) Int. Cl.
*G06F 3/0485* (2013.01)
*H04N 1/21* (2006.01)
*H04N 1/00* (2006.01)
*H04N 101/00* (2006.01)

(52) U.S. Cl.
CPC ....... *G06F 3/04855* (2013.01); *H04N 1/0044* (2013.01); *H04N 1/2145* (2013.01); *H04N 5/23245* (2013.01); *H04N 5/23293* (2013.01); *H04N 2101/00* (2013.01)

(58) Field of Classification Search
CPC ........... H04N 2101/00; H04N 5/23216; H04N 5/23245; H04N 5/23293
See application file for complete search history.

(56) References Cited

U.S. PATENT DOCUMENTS

| | | | |
|---|---|---|---|
| 2011/0221928 A1* | 9/2011 | Ishii | G11B 27/034 348/222.1 |
| 2011/0283232 A1* | 11/2011 | Jordan | H04N 5/44543 715/810 |
| 2012/0098989 A1* | 4/2012 | Sugawara | H04N 1/32101 348/222.1 |

FOREIGN PATENT DOCUMENTS

| | | |
|---|---|---|
| JP | 2000-354185 A | 12/2000 |
| JP | 2004-104594 A | 4/2004 |
| JP | 2005-229190 A | 8/2005 |
| JP | 2009-158989 A | 7/2009 |
| JP | 2010-193202 A | 9/2010 |
| JP | 2010-226319 A | 10/2010 |
| JP | 2012-085353 A | 4/2012 |
| JP | 2012-088801 A | 5/2012 |

OTHER PUBLICATIONS

International Search Report dated Jun. 10, 2014, issued for International Application No. PCT/JP2014/057861.

Written Opinion of the International Searching Authority issued by Japan Patent Office for International Application No. PCT/JP2014/057861.

\* cited by examiner

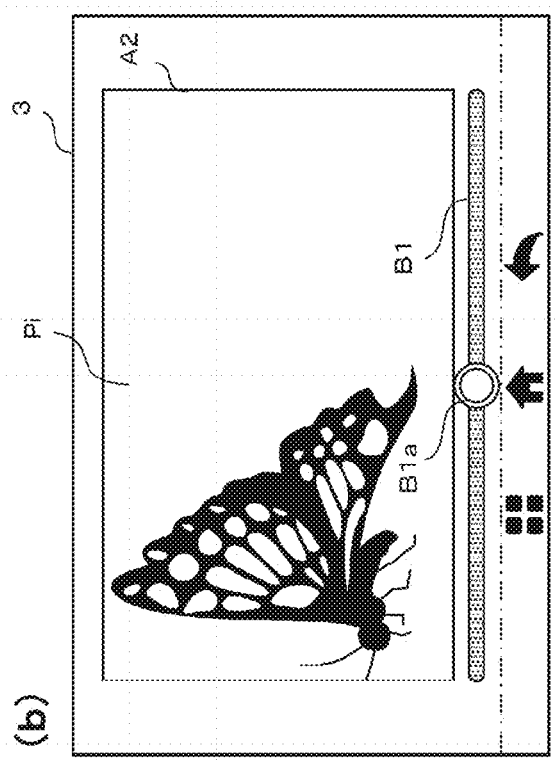
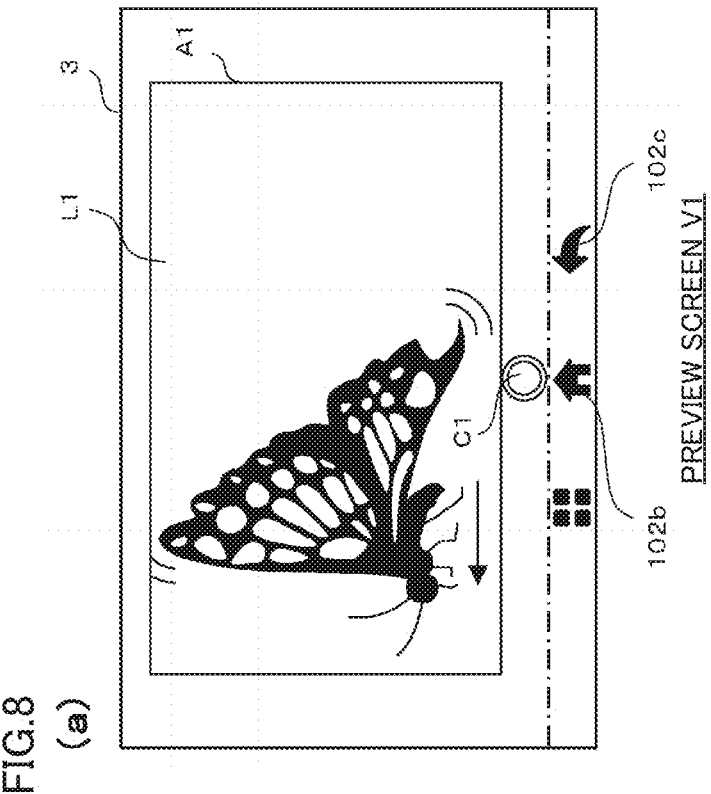
FIG.8

FIG.10
(a)
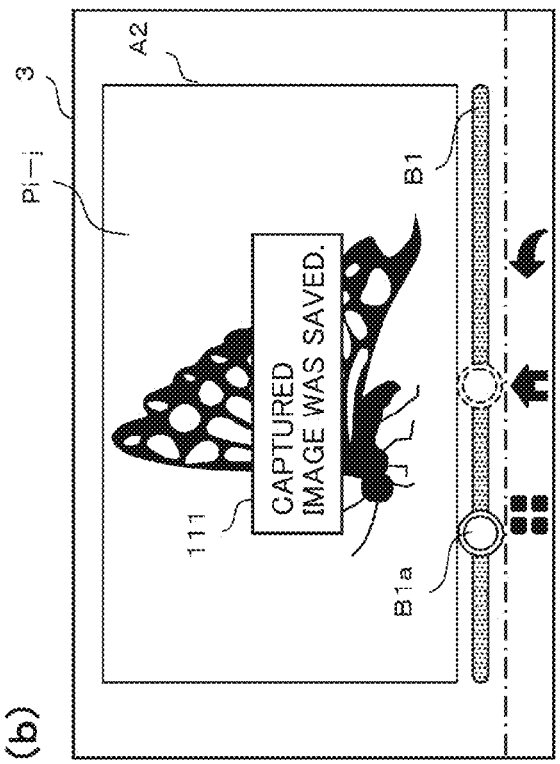
POSTVIEW SCREEN V2
(b)
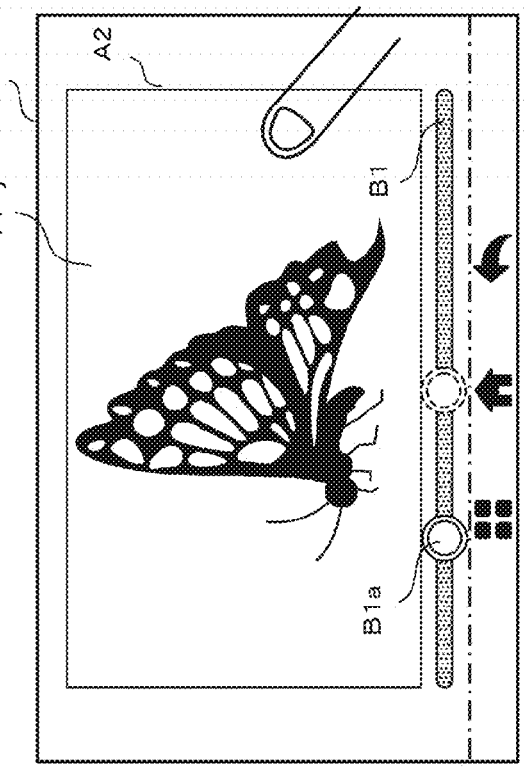
POSTVIEW SCREEN V2

FIG.11
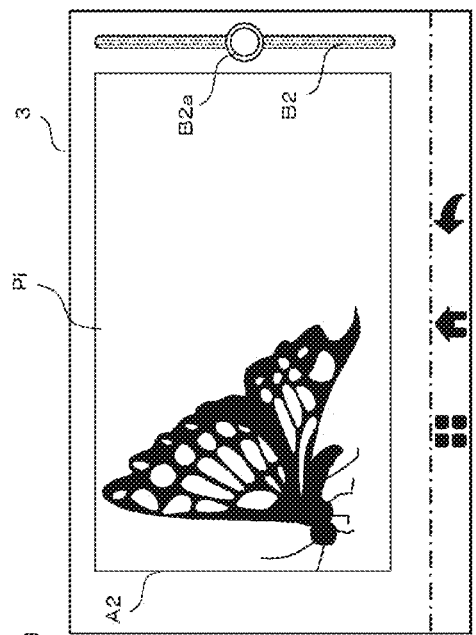
(a)
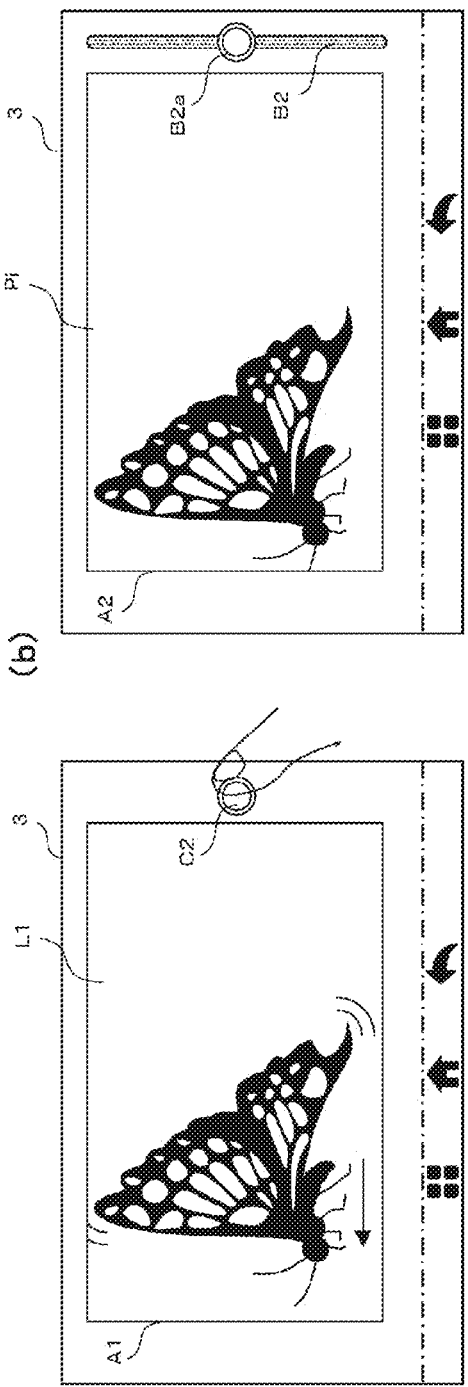
(b)
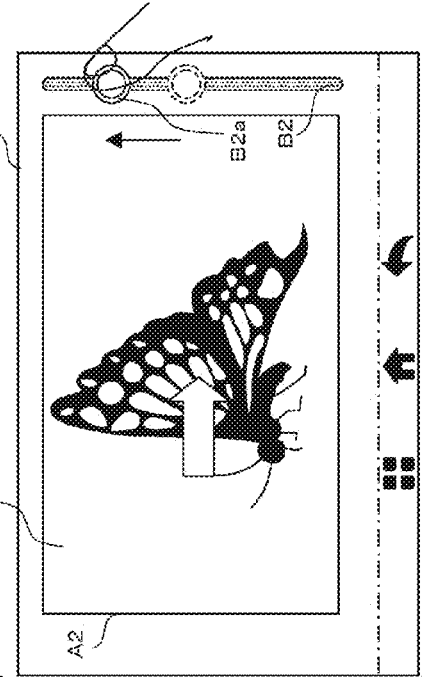
(c)
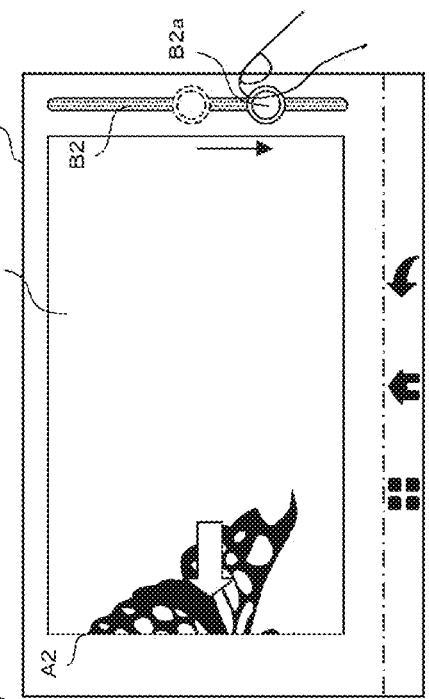
(d)

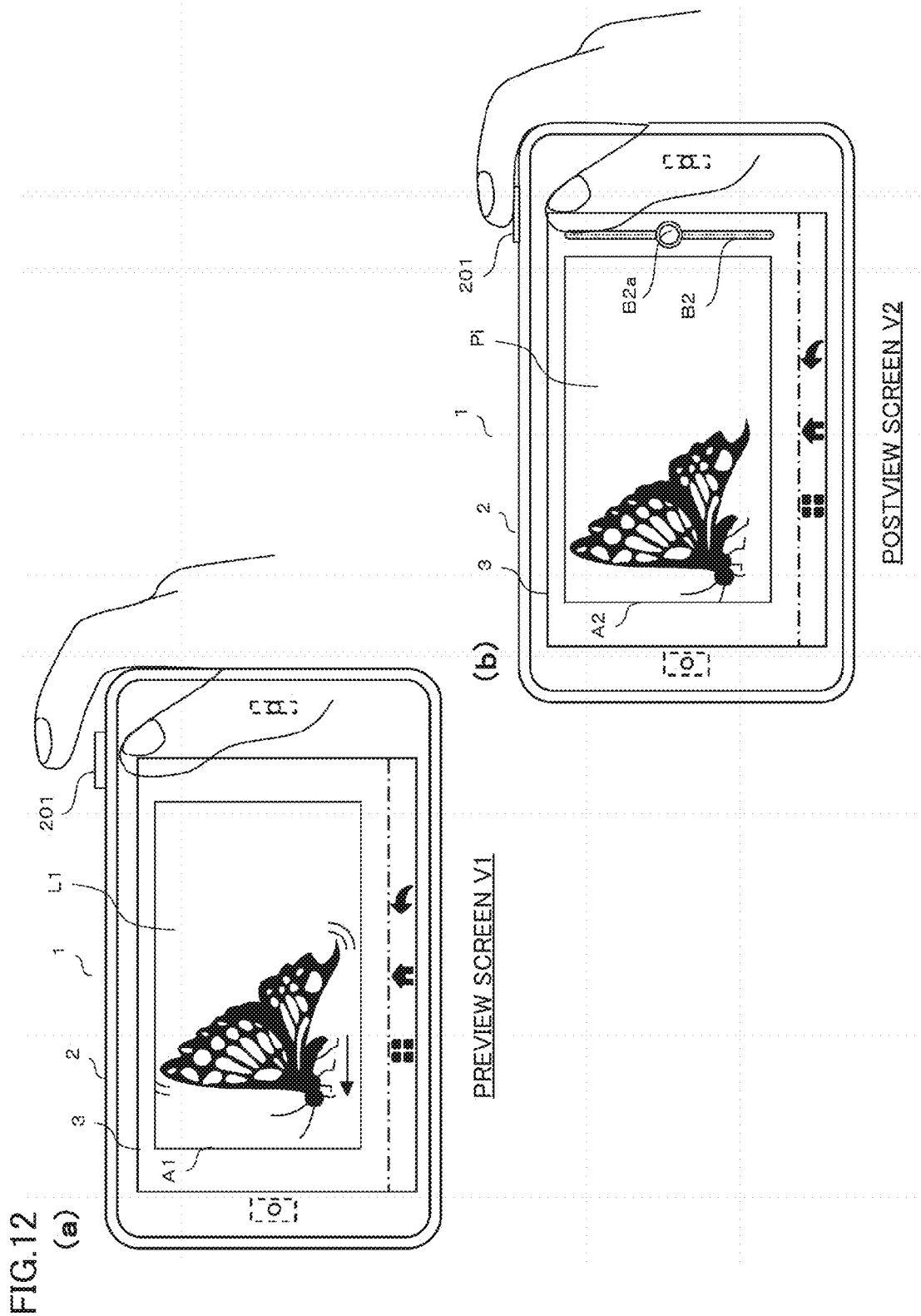

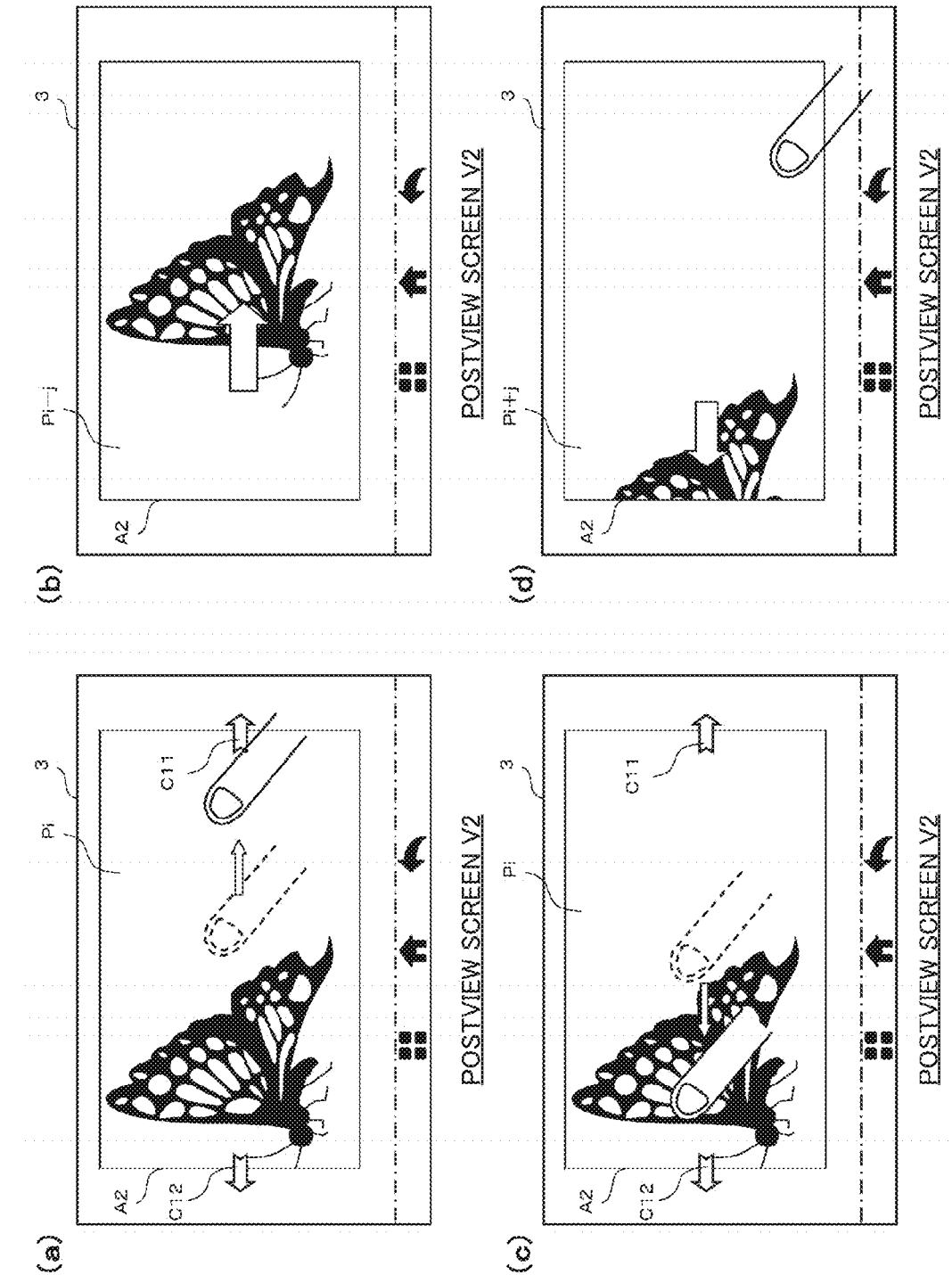

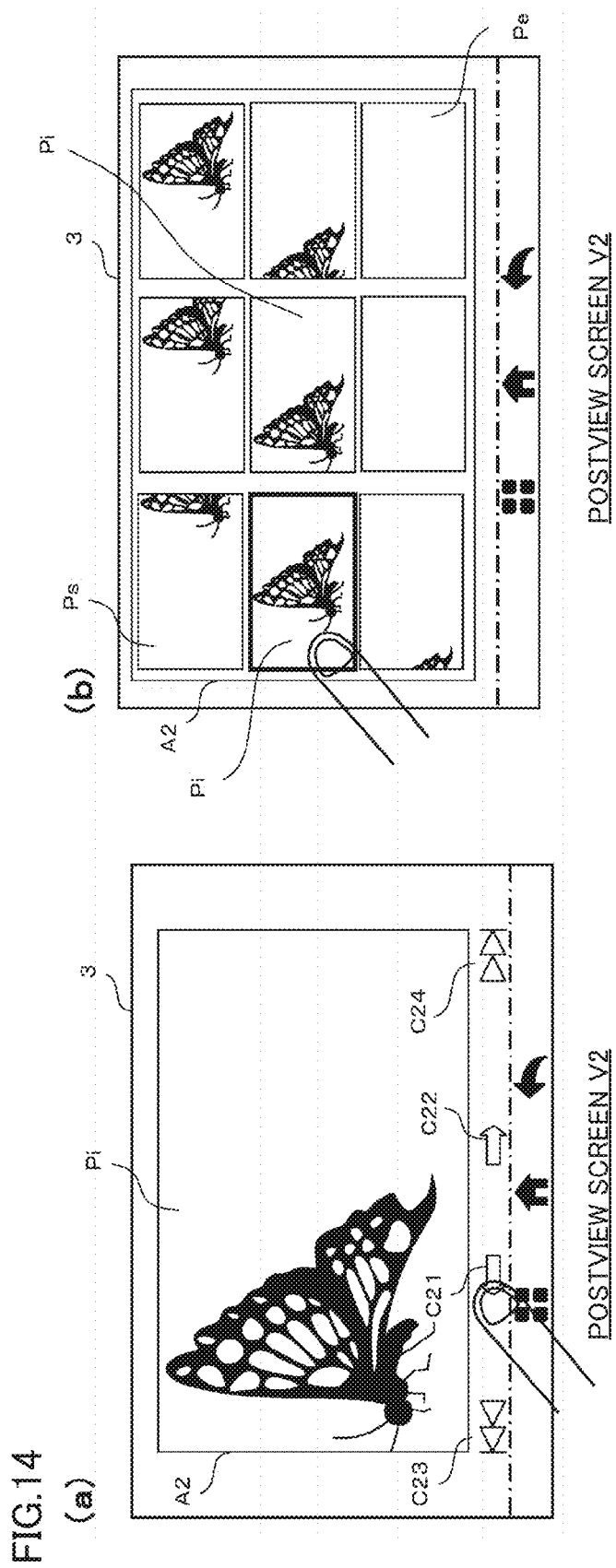

IMAGE CAPTURING APPARATUS AND CONTROL METHOD FOR SELECTING FROM SUCCESSIVELY-CAPTURED IMAGES

CROSS-REFERENCE TO RELATED APPLICATION

The present application is a continuation of international application PCT Application No. PCT/JP2014/057861 filed on Mar. 20, 2014, entitled "Imaging Device And Method For Controlling Imaging Device", which claims the benefit of Japanese Application No. 2013-058799, filed on Mar. 21, 2013, entitled "Image Capturing Apparatus and Control Method for Image Capturing Apparatus". The disclosure of the above applications are each incorporated herein by reference.

FIELD

The present disclosure relates to an image capturing apparatus and a control method for an image capturing apparatus, and more particularly to an image capturing apparatus such as a digital camera as well as a mobile phone, a PDA (Personal Digital Assistant), a tablet PC, an electronic book terminal, and the like provided with a camera, and a control method which is suitable for use in such an image capturing apparatus.

BACKGROUND

In recent years, mobile phones equipped with a camera have been widely spread. Among such mobile phones, a mobile phone having a successive capturing function of successively capturing images has been known.

SUMMARY

An image capturing apparatus according to one embodiment comprises a display module, a capturing module configured to capture successively first images at a predetermined time interval, an operation receiving module configured to receive an operation, a first storage module and a second storage module, and at least one processor. The at least one processor is configured to store temporarily the first images in the first storage module, cause the display module to display a selection screen for allowing a user to select one of the first images when the operation receiving module receives a first operation, and store the one of the first images in the second storage module when the operation receiving module receives an operation to select the one of the first images. The foregoing and other objects, features, aspects and advantages of the present disclosure will become more apparent from the following detailed description.

BRIEF DESCRIPTION OF THE DRAWINGS

FIG. 8 represents a preview screen and a postview screen in accordance with an embodiment.

FIG. 10 represents a screen transition of the postview screen in accordance with an embodiment.

FIG. 11 represents a screen transition of the postview screen in accordance with a modified example 1.

FIG. 12 represents a screen transition of the postview screen in accordance with a modified example 2.

FIG. 13 represents a screen transition of the postview screen in accordance with a modified example 3.

FIG. 14 represents a screen transition of the postview screen in accordance with a modified example 4.

DETAILED DESCRIPTION

Figure 1:
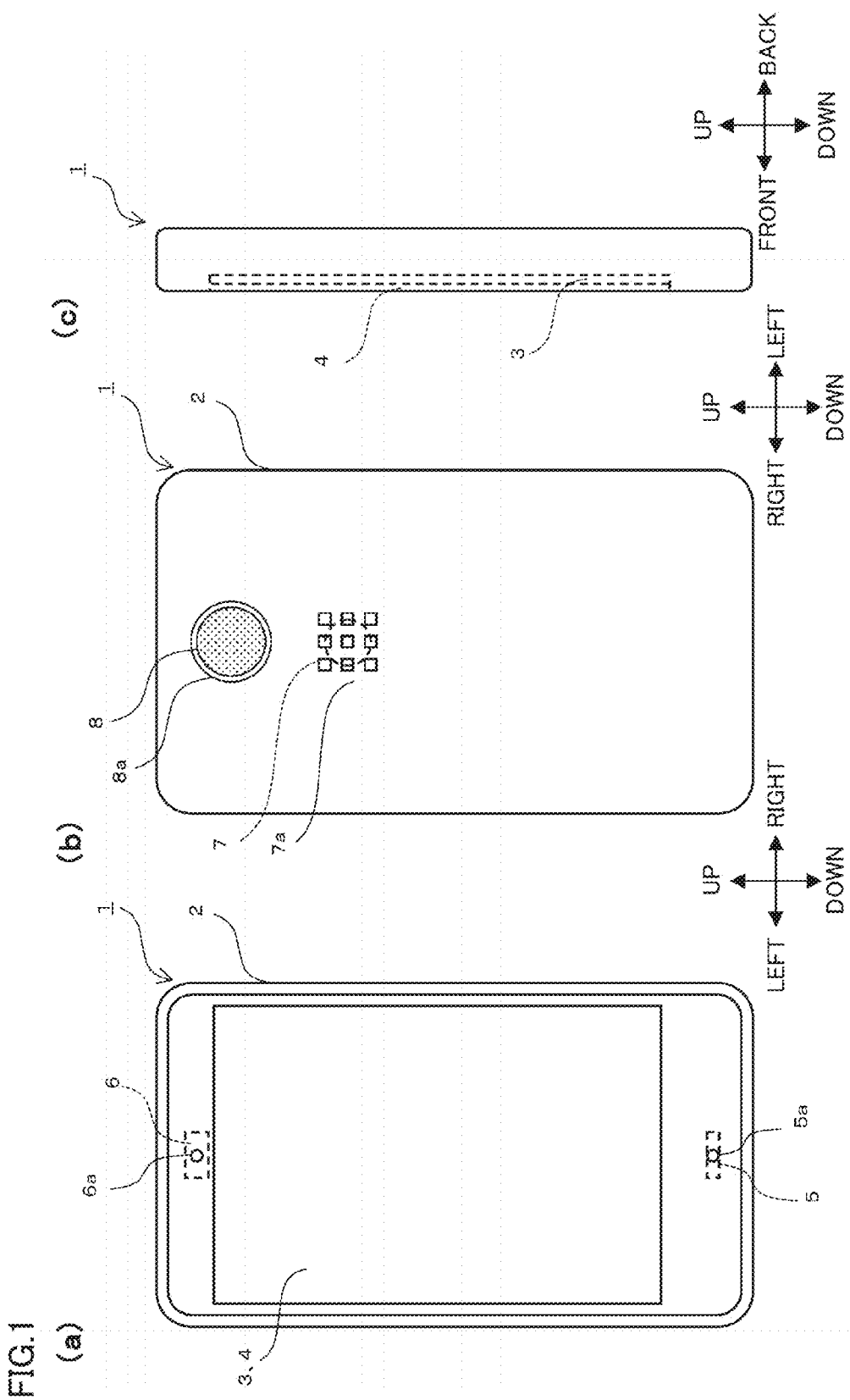
FIG. 1 represents a configuration of a mobile phone in accordance with an embodiment.

In a mobile phone of a background art, a user needs to perform a troublesome operation of selecting a desired photographed image from a large number of photographed images stored in an external storage medium. In order to resolve a shortage of a capacity of an external storage medium, a user also needs to perform a troublesome operation for deleting photographed images.

According to the present disclosure, a photographed image photographed at an appropriate capturing timing can be readily obtained.

In the following paragraphs, an embodiment will be described with reference to the drawings.

FIGS. 1(a), 1(b), and 1(c) are a front view, a rear view, and a right side view of a mobile phone 1, respectively. Hereinafter, for ease of description, a longitudinal direction of a cabinet 2 is defined as an upward/downward direction, and a short direction of cabinet 2 is defined as a leftward/rightward direction, as shown in FIGS. 1(a) to 1(c).

Mobile phone 1 includes a cabinet 2, a display 3, a front touch panel 4, a microphone 5, a telephone call speaker 6, an external speaker 7, and a camera 8.

Cabinet 2 can have a substantially rectangular contour when viewed from a front face. Display 3 can be located on a front face of cabinet 2. Various images (screens) can be displayed on display 3. Display 3 is, for example, a liquid crystal display. Display 3 may be other kind of display such as an organic electroluminescence display. A touch panel 4 can be located so as to cover display 3. Touch panel 4 is formed to be a transparent sheet. As touch panel 4, a touch panel of various types such as an electrostatic capacitance type, an ultrasonic type, a pressure-sensitive type, a resistive film type, an optical detection type, or the like can be used.

In cabinet 2, microphone 5 can be located in a lower end portion, and telephone call speaker 6 can be located in an upper end portion. A voice can be inputted to microphone 5 through a microphone hole 5a formed on a front face of cabinet 2. Microphone 5 can generate an electric signal in accordance with the inputted sound. A voice can be outputted from telephone call speaker 6. The outputted voice can be emitted to outside through an output hole 6a formed on a front face of cabinet 2. When a telephone call is made, a received voice which is received from equipment (a mobile phone or the like) of a communication destination can be outputted from telephone call speaker 6, and an uttered voice which is uttered by a user can be inputted to microphone 5.

In cabinet 2, external speaker 7 can be located. On a back side of cabinet 2, output holes 7a corresponding to external speaker 7 can be formed. A sound (a voice, an informing sound, and the like) outputted from external speaker 7 can be emitted through output holes 7a.

In cabinet 2, a camera 8 can be located. On a back face of cabinet 2, a lens window 8a can be provided, and an image of a photographic subject can be captured to camera 8 through lens window 8a.

Figure 2:
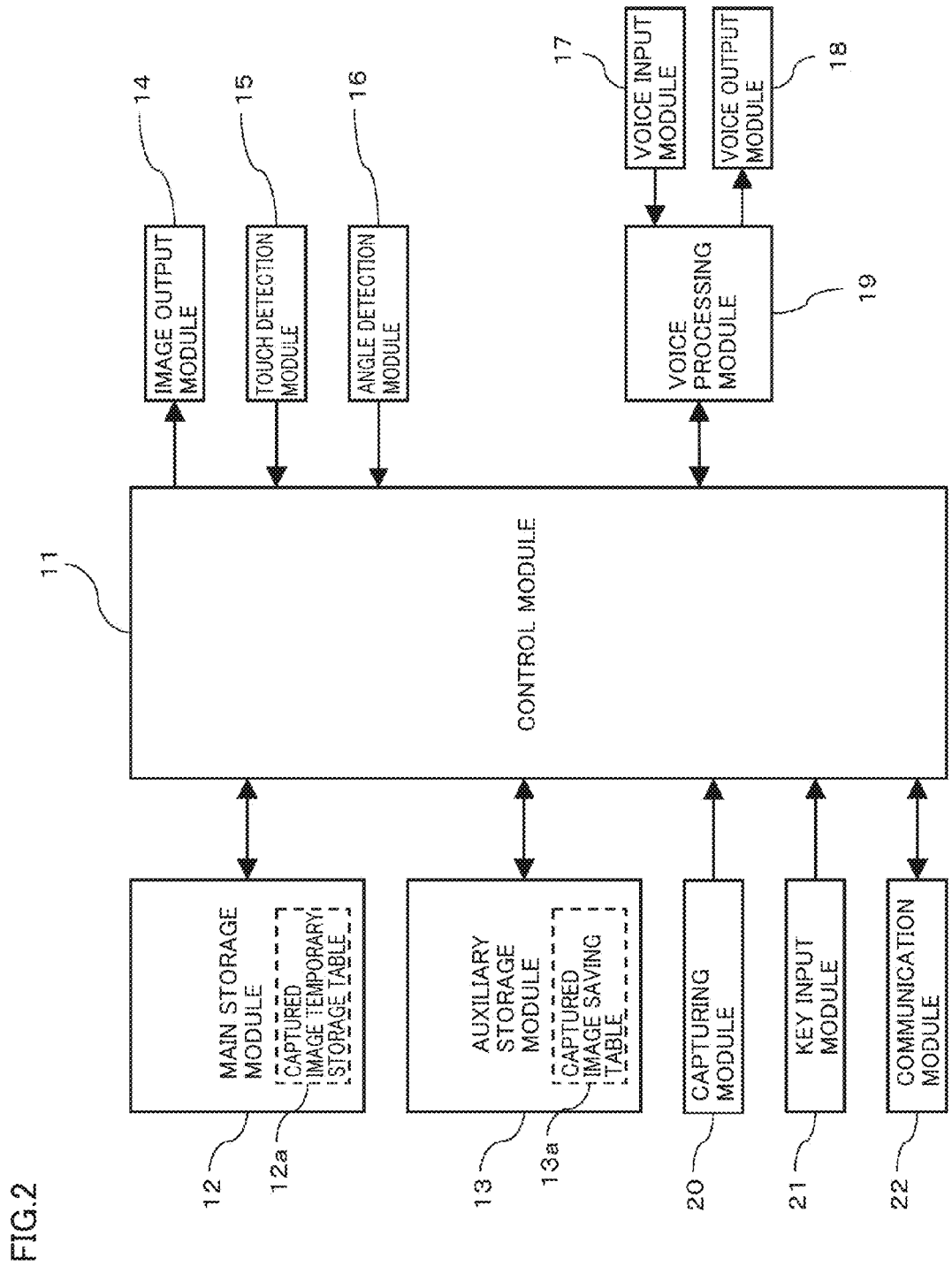
FIG. 2 is a block diagram representing an entire configuration of a mobile phone in accordance with an embodiment.

FIG. 2 is a block diagram representing an entire configuration of mobile phone 1. Mobile phone 1 includes a control module 11, a main storage module 12, an auxiliary storage module 13, an image output module 14, a touch detection module 15, an angle detection module 16, a voice input module 17, a voice output module 18, a voice processing module 19, a capturing module 20, a key input module 21, and a communication module 22.

Main storage module 12 can include a temporary storage medium such as a RAM which can be directly accessed by control module 11 at a high speed. Main storage module 12 can include an unillustrated working area which stores data primarily used or generated at the time of executing a program.

Auxiliary storage module 13 can include an ROM, an RAM, an external memory, and the like. Auxiliary storage module 13 can store various programs. The programs stored in auxiliary storage module 13 can include a control program for controlling each module of mobile phone 1 and various applications (for example, telephone, e-mail, telephone directory, map, game, schedule management, and the like). The programs can be stored in auxiliary storage module 13 by a manufacturer at the time of manufacturing mobile phone 1 or can be stored in auxiliary storage module 13 by a user through a communication network or a storage medium such as a memory card.

Figure 3:
FIG. 3 represents configurations of a photographed image temporary storage table and a photographed image saving table in accordance with an embodiment.

Main storage module 12 can store a photographed image temporary storage table 12a shown in FIG. 3(*a*). In photographed image temporary storage table 12a, photographed images, which were photographed before and after a shutter of camera 8 was operated by a user, for each capturing timing at a predetermined time interval. A capturing timing Ti is a capturing timing which is immediately after an operation of a shutter by a user, and a capturing timing Ts is an oldest capturing timing, and a capturing timing Te is a newest capturing timing. For example, the capturing timing arrives every 1/30 seconds. Photographed image temporary storage table 12a can have a capacity for registering photographed images for the number of capturing timings Ts to Te. When the capacity of photographed image temporary storage table 12a reaches an upper limit, control module 11 can overwrite the photographed image of oldest capturing timing Ts with the newest photographed image.

Auxiliary storage module 13 can store a photographed image saving table 13a shown in FIG. 3(*b*). Photographed image saving table 13a can record a capturing date and a saved image photographed by a user with camera 8. It should be noted that, other than those, photographed image saving table 13a may also record a model name, a resolution, a capturing condition, and the like of camera 8.

Control module 11 can include a CPU or the like. Control module 11 can control each module of mobile phone 1 (control module 11, main storage module 12, auxiliary storage module 13, image output module 14, touch detection module 15, angle detection module 16, voice input module 17, voice output module 18, voice processing module 19, capturing module 20, key input module 21, communication module 22, and the like) in accordance with a program.

Image output module 14 can include a display 3 and the like shown in FIG. 1. Image output module 14 can display an image (screen) on display 3 based on a control signal and an image signal from control module 11.

Touch detection module 15 can include touch panel 4 shown in FIG. 1 and detect a touch operation with respect to touch panel 4. More specifically, touch detection module 15 can detect a contact position of a contact object such as a user's finger with respect to touch panel 4 (hereinafter, referred to as "touch position"). Touch detection module 15 can output a position signal generated based on a detected touch position to control module 11.

A user can perform various touch operations by touching touch panel 4 with a finger. Kinds of touch operations include a tap operation, a flick operation, a slide operation, a drag operation, a long tap operation, and the like. The tap operation is an operation in which a user touches touch panel 4 with a finger and thereafter releases the finger from touch panel 4 within a short period of time. The flick operation is an operation in which a user flicks touch panel 4 with a finger in any direction. The slide operation is an operation in which a user holds a finger being touched to touch panel 4 and moves it in any direction. The drag operation is an operation of leaving a finger from touch panel 4 after performing the slide operation. The flick operation, slide operation, and drag operation are touch operations involving movement of a touch position. The long tap operation is an operation of touching touch panel 4 with a finger, maintaining the contact for a while, and leaving the finger from touch panel 4.

The touch operation will be described more specifically. For example, after a touch position with respect to touch panel 4 is detected by touch detection module 15, when the touch position is not detected within a predetermined first time period, in other words, when an operation of leaving a finger from touch panel 4 is performed, control module 11 can determine that the tap operation was performed. After a touch position with respect to touch panel 4 is detected by touch detection module 15, and the touch position is moved by a distance longer than a predetermined first distance within a predetermined second time period, when the touch position is not detected, control module 11 can determine that the flick operation was performed. After a touch position with respect to touch panel 4 is detected by touch detection module 15, and the touch position is moved by a distance longer than a predetermined second distance, control module 11 can determine that the slide operation was performed. After a touch position with respect to touch panel 4 is detected by touch detection module 15, when the touch position is detected continuously for a time period longer than a predetermined third time period, and thereafter the touch position is not detected, control module 11 can determine that the long tap operation was performed.

Angle detection module 16 can include an accelerometer, an angle detection circuit, and the like. Angle detection module 16 can detect a change in a tilt angle of cabinet 2, and output an electric signal corresponding to the change in the tilt angle to control module 11.

Voice input module 17 can include microphone 5 and the like. Voice input module 17 can output an electric signal from microphone 5 to voice processing module 19.

Voice output module 18 can include telephone call speaker 6 and external speaker 7. An electric signal from voice processing module 19 can be inputted to voice output module 18, and a sound (a voice, an informing sound, and the like) can be outputted from telephone call speaker 6 or external speaker 7.

Voice processing module 19 can apply an A/D conversion and the like to an electric signal from voice input module 17 and output a converted digital voice signal to control module 11. Voice processing module 19 can apply a D/A conversion and the like to a digital voice signal from control module 11 and output a converted electric signal to voice output module 18.

Photographing module 20 can include a camera 8 provided with a CMOS image sensor shown in FIG. 1, an image capturing control circuit, and the like. Photographing module 20 can adjust an exposure time of the CMOS image sensor by means of a function of an electronic shutter to obtain image data with a desired brightness. Photographing module 20 can apply various image processing to image data of an image photographed by camera 8 and output image data, to which the image processing is applied, to control module 11.

Photographing module 20 has a monitor mode function capable of outputting an image formed on the CMOS image sensor to control module 11 with a low resolution, and a still image capturing mode function capable of outputting an image formed on the CMOS image sensor to control module 11 with a high resolution. The monitor mode can display the low resolution image on display 3 as a moving image, so that it can be used for allowing a user to confirm a state of a photographic subject at the time of capturing. The still image capturing mode can be used for saving the high resolution image at the timing of operating the shutter of camera 8 to photographed image saving table 13*a* of auxiliary storage module 13 as a till image. Photographing module 20 can obtain a low resolution image and a high resolution image in parallel by means of a time shared control.

Key input module 21 can include various hard keys (not shown), such as a power key for turning on a power of mobile phone 1, located on mobile phone 1. When any hard key is pressed, key input module 21 can output a signal corresponding to the pressed hard key to control module 11.

Communication module 22 can include a circuit for converting a signal, an antenna for communicating a radio wave, and the like to perform a telephone call or a communication. Communication module 22 can convert the signal inputted from control module 11 for a telephone call and a communication into a radio signal, and transmit the converted radio signal to a communication destination such as a base station, other communication device, or the like through the antenna. Further, communication module 22 can convert the radio signal received through the antenna into a signal of a type which can be used by control module 11, and output the converted signal to control module 11.

Figure 4:
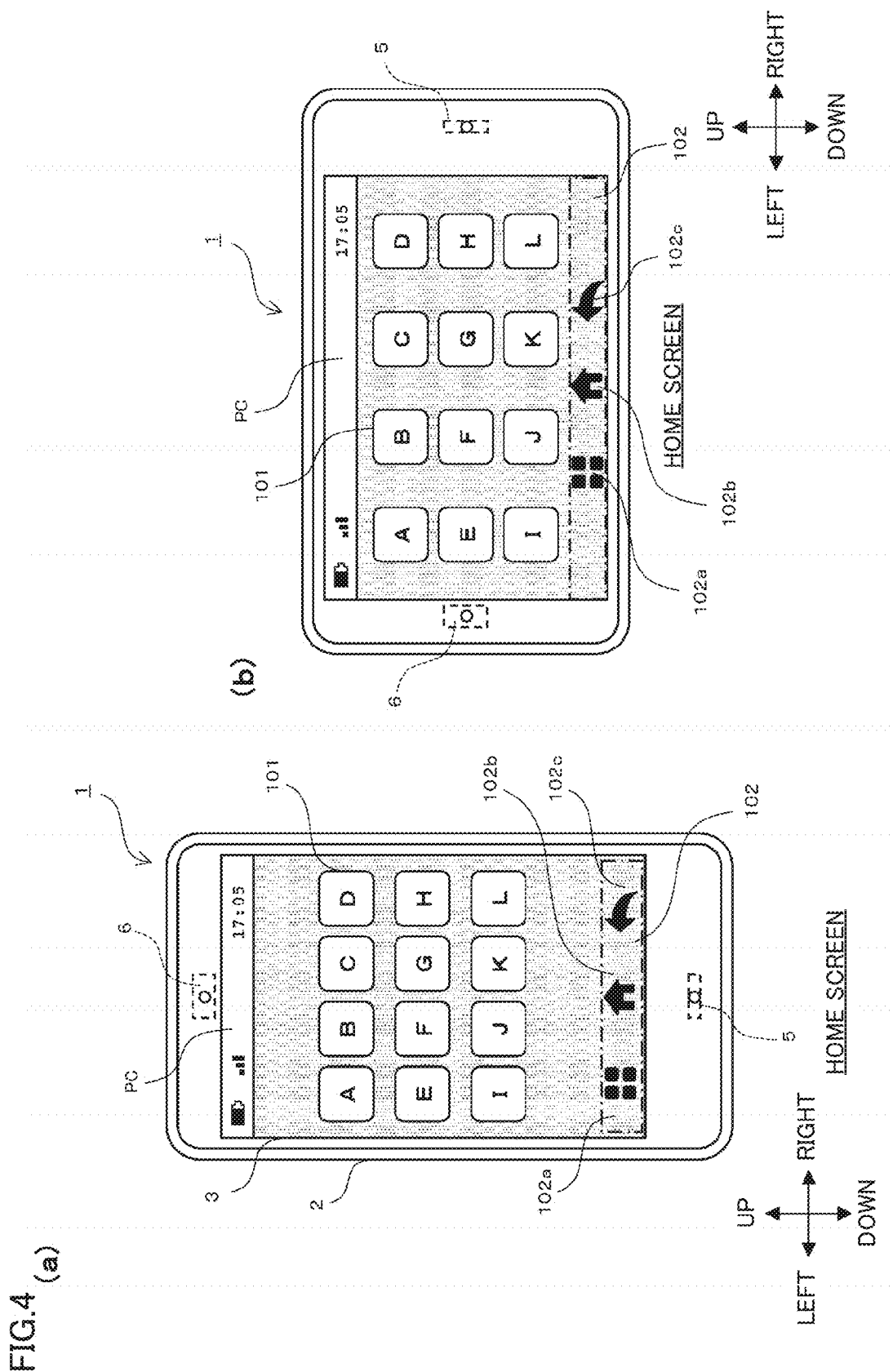
FIG. 4 represents a home screen in accordance with an embodiment.

FIG. 4(*a*) represents one example of a home screen. FIG. 4(*b*) represents one example of the home screen in a case where mobile phone 1 is tilted in the leftward/rightward direction.

The home screen can include icons 101 corresponding to various applications. When a user performs the tap operation with respect to any icon 101, an application corresponding to that icon 101 can be launched.

Further, the home screen can include an operation key group 102. Operation key group 102 can include a setting key 102*a*, a home key 102*b*, and a back key 102. Setting key 102*a* is a key for mainly displaying on display 3 a setting screen for performing various settings. Home key 102*b* is a key for mainly allowing a display of display 3 to shift from other screen to the home screen. Back key 102*c* is a key for mainly returning an executed processing to a previous processing by one step.

Further, the home screen can include a pictogram region PC in an upper end portion.

Pictogram region PC, icons 101, and operation key group 102 can be relocated as shown in FIG. 4(*b*) when a user tilts mobile phone 1 in the leftward/rightward direction.

Mobile phone 1 of an embodiment can have a capturing control function capable of readily obtaining a photographic subject at an appropriate capturing timing.

Figure 5:
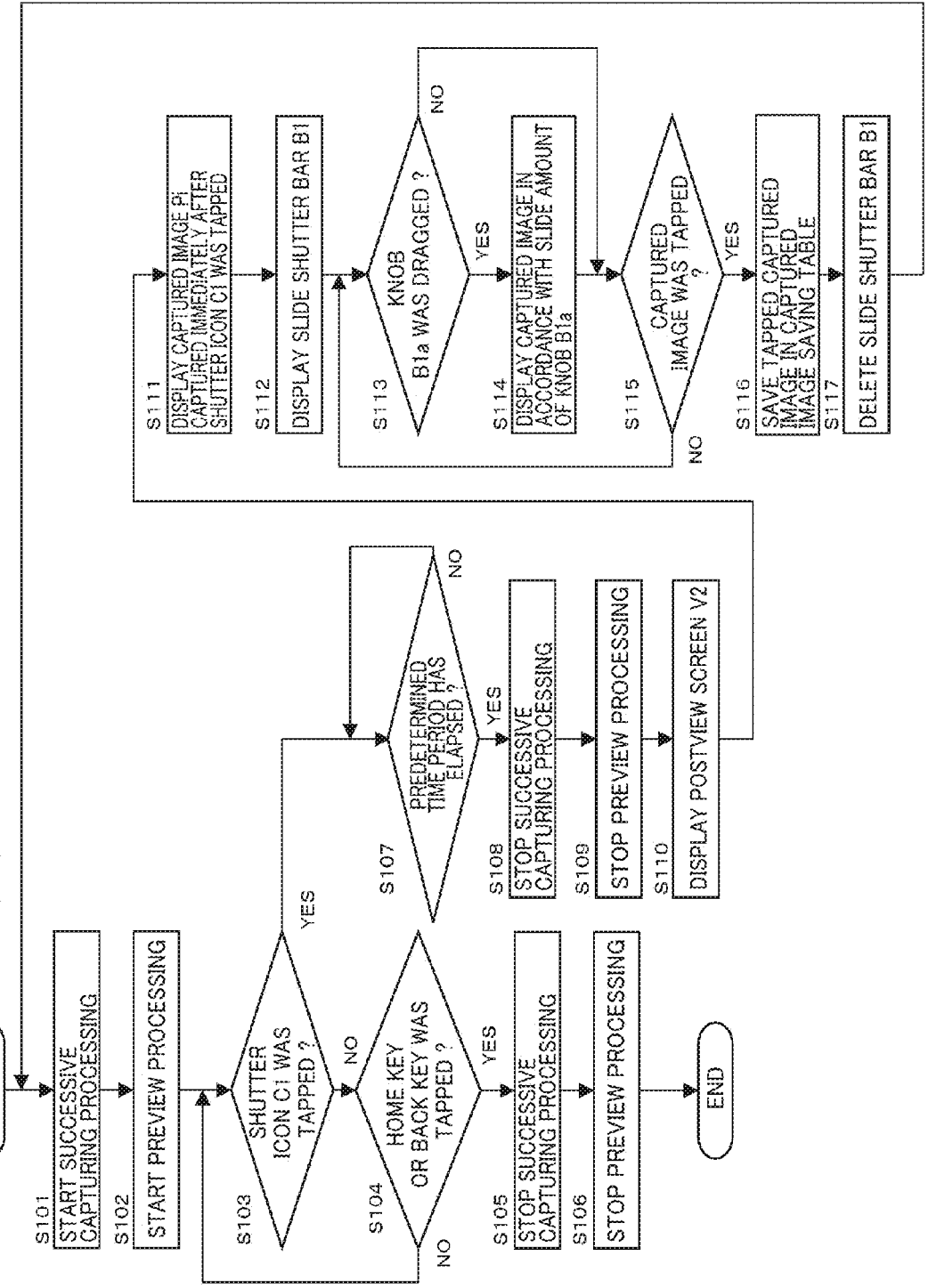
FIG. 5 is a flowchart representing a capturing control processing in accordance with an embodiment.

FIG. 5 is a flowchart representing a capturing control processing. The capturing control processing of FIG. 5 can be started when the tap operation is performed with respect to an icon corresponding to an application of a camera function among icons 101 located in on the home screen. When mobile phone 1 is equipped with a hard key corresponding to the camera function, the capturing control processing of FIG. 5 may be started not only by the operation with respect to the icon but also by pressing the hard key.

When the application of the camera function is launched, control module 11 can start the successive capturing processing of successively obtaining high resolution images by means of the still image capturing mode function of capturing module 20 (S101).

Figure 6:
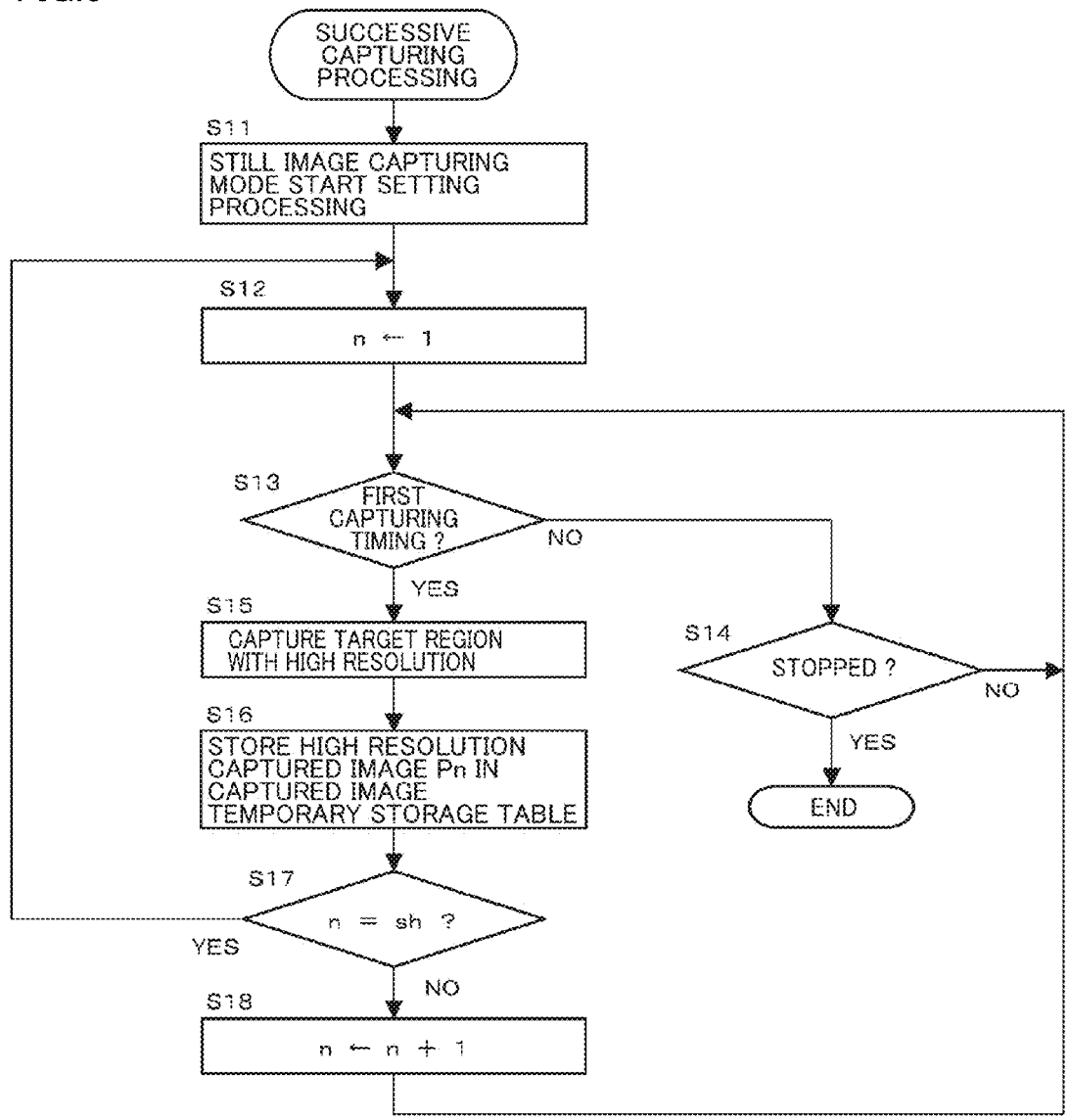
FIG. 6 is a flowchart representing a successive capturing processing in accordance with an embodiment.

FIG. 6 is a flowchart representing the successive capturing processing. The successive capturing processing of FIG. 6 can be executed in parallel with the capturing control processing of FIG. 5 and the preview processing of FIG. 7.

Referring to FIG. 6, control module 11 can perform a still image capturing mode start setting processing with respect to capturing module 20 (S11). The still image capturing mode start setting processing can include, for example, a processing for validating various parameters required for obtaining an image formed on the CMOS image sensor with a high resolution and a processing for defining a predetermined first capturing timing. Control module 11 can set 1 to a variable n for counting the number of capturing (S12). Control module 11 can determine whether or not the first capturing timing has arrived (S13). An interval of the first capturing timing can be set as, for example, 1/30 seconds.

When the first capturing timing has not arrived (S13:NO), control module 11 returns the processing to S13 and repeats the processing for determining an arrival of the first capturing timing unless the successive capturing processing is stopped by the processing of S105 in the capturing control processing (S14:NO).

When the first capturing timing has arrived (S13:YES), control module 11 can photograph a target region with a high resolution by means of capturing module 20 (S15). Control module 11 can store a high resolution photographed image Pn outputted from capturing module 20 to photographed image temporary storage table 12*a* of main storage module 12 (S16). Control module 11 can determine whether or not variable n has reached a predetermined threshold value sh (S17). Predetermined threshold value sh can be set to the maximum number of photographed images to be recorded in photographed image temporary storage table 12*a*. For example, when the interval of the first capturing timing is 1/30 seconds, and photographed images for 2 seconds are accumulated, threshold value sh can be set to 60. When a variable n has not reached predetermined threshold value sh (S17: NO), control module 11 can add 1 to variable n (S18), return the processing to S13, and determine an arrival of next first capturing timing.

When variable n has reached predetermined threshold value sh (S17:YES), control module 11 returns the processing to S12 and sets 1 to variable n. Accordingly, a photographed image photographed at an oldest first capturing timing is overwritten with a photographed image photographed at next first capturing timing.

The successive capturing processing described above is executed repeatedly until it is stopped by control module 11.

Returning to FIG. 5, control module 11 can start a processing of successively obtaining low resolution images by means of a monitor mode function of capturing module 20 in parallel with the successive capturing processing, and displaying a preview screen V1 on display 3 (S102).

Figure 7:
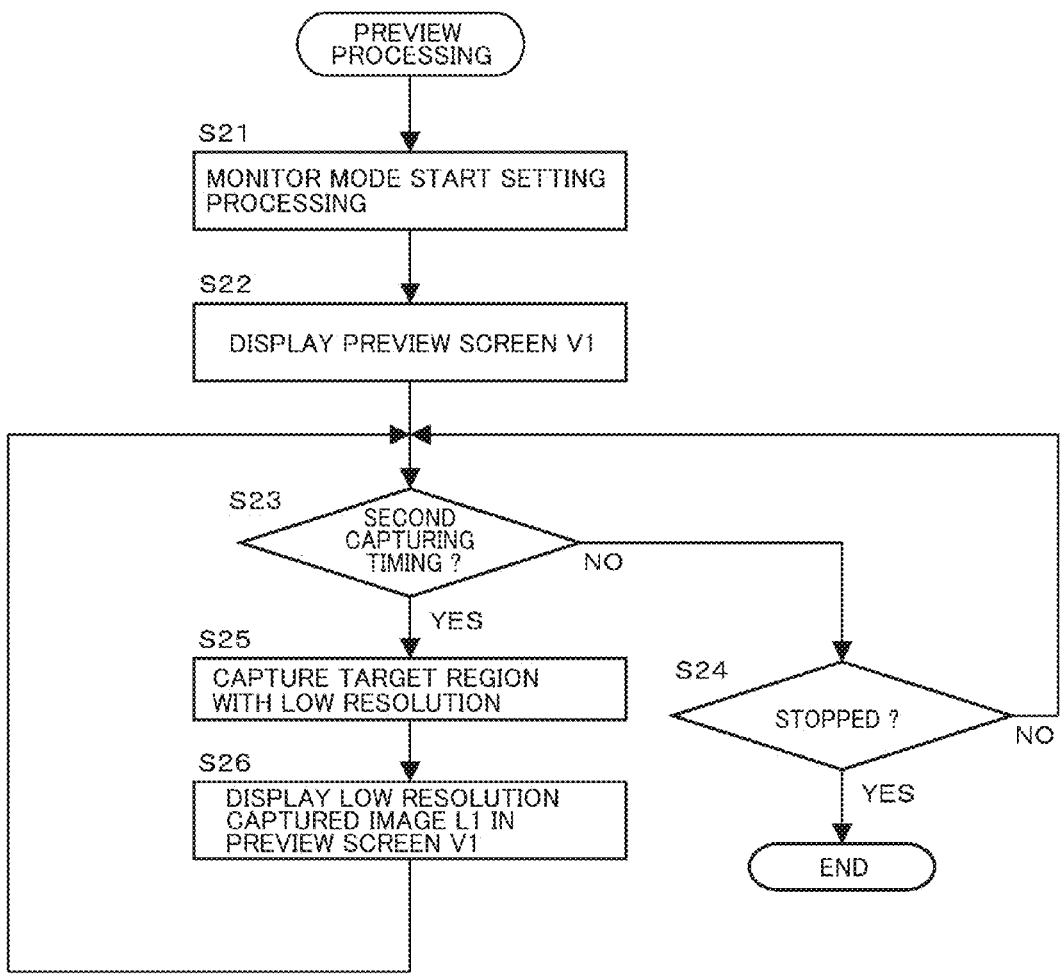
FIG. 7 is a flowchart representing a preview processing in accordance with an embodiment.

FIG. 7 is a flowchart representing the preview processing. The preview processing of FIG. 7 can be executed in parallel with the capturing control processing of FIG. 5 and the successive capturing processing of FIG. 6.

Referring to FIG. 7, control module 11 can execute the monitor mode start setting processing with respect to capturing module 20 (S21). The monitor mode start setting processing can include, for example, a processing for validating various parameters required for obtaining an image formed on the CMOS sensor with a low resolution, a processing of defining a second capturing timing which is different from the first capturing timing, and the like. Control module 11 can display preview screen V1 on display 22 by controlling image output module 14 (S22). Control module 11 can determine whether or not the second capturing timing has arrived (S23). An interval of the second capturing timing can be set as, for example, 1/30 seconds.

When the second capturing timing has not arrived (S23:NO), control module 11 returns the processing to S22 and repeats the determination processing for the second capturing timing unless the preview processing is stopped by the processing of S106 in the capturing control processing (S24:NO).

When the second capturing timing has arrived (S23:YES), control module 11 can photograph a target region with a low resolution by means of capturing module 20 (S25). Control module 11 can output a low resolution photographed image L1 outputted from capturing module 20 to image output module 14, and display photographed image L1 on preview screen V1 (S26) as shown in FIG. 8(a). Returning the processing to S23, an arrival of next second capturing timing is determined.

The preview processing described above can be executed repeatedly until it is stopped by control module 11.

FIG. 8(a) represents preview screen V1. It should be noted that FIG. 8 is an example of a screen display in the case where mobile phone 1 is tilted in the leftward/rightward direction as shown in FIG. 4(b). It similarly applies to the subsequent examples of the screen display.

Preview screen V1 can include a shutter icon C1 and a display area A1. In display area A1, a low resolution photographed image L1 photographed at the predetermined second capturing timing can be displayed. The photographed image L1 can be updated at an interval of 1/30 seconds. In preview screen V1, a moving image of 30 fps (flames per second) can be displayed. A user can look at preview screen V1 to confirm a state of a photographic subject at the time of capturing. Returning to FIG. 5, when the successive capturing processing and the preview processing are started, control module 11 can determine whether or not the tap operation was performed with respect to shutter icon C1 of preview screen V1 (S103).

When the tap operation was not performed with respect to shutter icon C1 (S103:NO), control module 11 can determine whether or not the tap operation was performed with respect to home key 102b or back key 102c (S104). When the tap operation was not performed with respect to home key 102b or back key 102c (S104:NO), control module 11 can return the processing to S103 and determine whether or not the tap operation with respect to shutter icon C1 was performed. When the tap operation was performed with respect to home key 102b or back key 102c (S104:YES), control module can stop the successive capturing processing and the preview processing (S105, S106) and terminate the capturing control processing.

When the tap operation was performed with respect to shutter icon C1 (S103:YES), control module 11 can determine whether or not a predetermined time period has elapsed since the tap operation was performed with respect to shutter icon C1 (S107). The predetermine time period can be set to, for example, 1 second. When the predetermined time period has not elapsed (S107:NO), control module 11 can wait for an elapse of the predetermined time period. Accordingly, the successive capturing processing is continued for one second, so that 30 high resolution photographed images, which were photographed after the tapping operation with respect to shutter icon C1, can be accumulated in photographed image temporary storage table 12a. At this time, 30 high resolution photographed images, which were photographed for one second before the tap operation was performed with respect to shutter icon C1, are also accumulated in photographed image temporary storage table 12a. Therefore, 60 photographed images in total are accumulated.

When the predetermined time period has elapsed (S107:YES), control module 11 can stop the successive capturing processing and the preview processing (S108, S109), and display postview screen V2 on display 3 (S110). Then, control module 11 can read photographed image Pi, which was photographed at a timing immediately after the tap operation was performed with respect to shutter icon C1, from photographed image temporary storage table 12a, output the same to image output module 14, and display photographed image Pi on postview screen V2 as shown in FIG. 8(b) (S111). Further, control module 11 can display a slide shutter bar B1 on postview screen V2 (S112).

FIG. 8(b) represents postview screen V2. Postview screen V2 can include a display area A2 and slide shutter bar B1. In display area A2, a high resolution photographed image can be displayed which was photographed at the predetermined first capturing timing. In FIG. 8(b), photographed image Pi is displayed which was photographed immediately after the tap operation was performed with respect to shutter icon C1. Slide shutter bar B1 includes a knob B1a. Knob B1a can be dragged in the leftward/rightward direction along slide shutter bar B1. In FIG. 8(b), knob B1a is positioned at a center of slide shutter bar B1.

Returning to FIG. 5, control module 11 can determine whether or not the drag operation was performed with respect to knob B1a (S113). When the drag operation was performed with respect to knob B1a (S113:YES), control module 11 can display a photographed image in accordance with the amount of sliding from a center position of knob B1a (S114). Control module 11 can determine whether or not the tap operation was performed with respect to the displayed photographed image (S115). When the tap operation was not performed with respect to the displayed photographed image (S115:NO), control module 11 can return the processing to S113 and repeat the processing of selecting the photographed image.

FIGS. 9(a) to 9(d) represent an example of a screen transition of postview screen V2.

Figure 9:
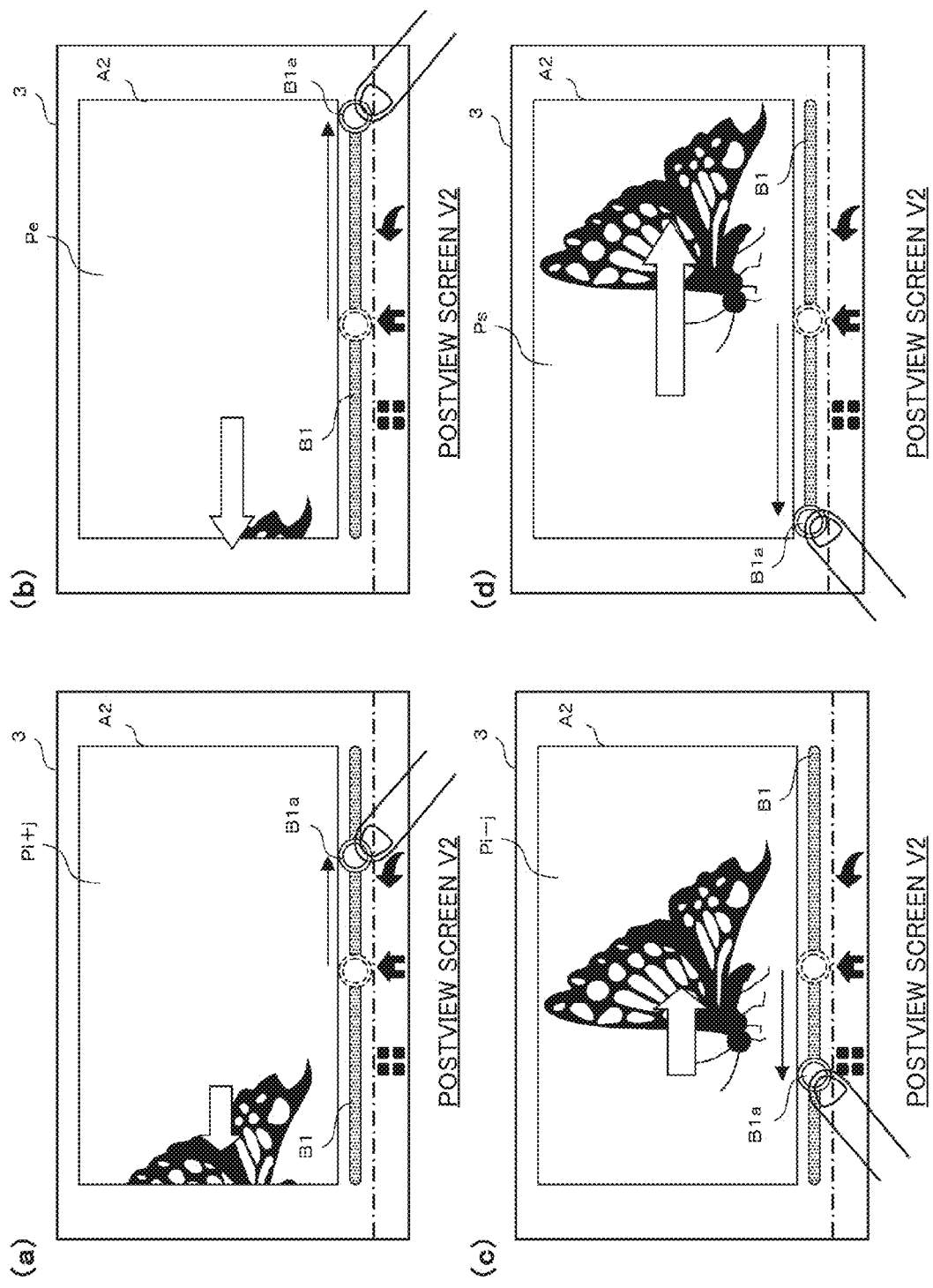
FIG. 9 represents a screen transition of the postview screen in accordance with an embodiment.

As shown in FIG. 9(a), when the drag operation was performed with respect to knob B1a in a rightward direction from a center position of slide shutter bar B1, a photographed image P1+j, which was photographed after the tap operation was performed with respect to shutter icon C1, is displayed in display area A2 in accordance with the amount of sliding in the rightward direction from the center position. Photographed image Pi+j is, for example, a photographed image which was photographed 0.5 seconds after the tap operation was performed with respect to shutter icon C1.

Further, as shown in FIG. 9(b), when the drag operation was performed with respect to knob B1a to the right end of slide shutter bar B1, a newest photographed image Pe, which was photographed after the tap operation was performed with respect to shutter icon C1, is displayed in display area A2. Photographed image Pe is, for example, a photographed image which was photographed 1 second after the tap operation was performed with respect to shutter icon C1.

As shown in FIG. 9(c), when the drag operation was performed with respect to knob B1a in the leftward direction from the center position of slide shutter bar B1, a photographed image Pi-j, which was photographed before the tap operation was performed with respect to shutter icon C1, is displayed in display area A2 in accordance with the amount of sliding in the leftward direction from the center position. Photographed image Pi-j is, for example, a photographed image which was photographed 0.5 seconds before the tap operation was performed with respect to shutter icon C1.

Further, as shown in FIG. 9(d), when the drag operation was performed with respect to knob B1a to the left end of slide shutter bar B1, an oldest photographed image Ps, which was photographed before the tap operation was performed with respect to shutter icon C1, is displayed on display area A2. Photographed image Ps is, for example, a photographed image which was photographed one second before the tap operation was performed with respect to shutter icon C1.

As described above, by performing the drag operation with respect to knob B1a of slide shutter bar B1 to any position, a user can select a desired photographed image from photographed images which were photographed before and after the tap operation was performed with respect to shutter icon C1. In an embodiment, a photographed image which was photographed at the most suitable capturing timing can be selected from 60 photographed images photographed one second before the tap operation was performed with respect to shutter icon C1 and one second after the tap operation was performed with respect to shutter icon C1.

Returning to FIG. 5, when the tap operation was performed with respect to the photographed image selected by a user (S115:YES), control module 11 can save one photographed image, which is displayed on post view screen V2 at the time when the tap operation was performed, to photographed image saving table 13a of auxiliary storage module 13 (S116).

FIGS. 10(a) and 10(b) represent an example of a screen transition at the time when a photographed image is saved.

In postview screen V2 shown in FIG. 10(a), knob B1a is located at a position proceeded in the leftward direction from the center position of slide shutter bar B1, and a user's desired photographed image Pi-j is displayed on display area A2. In this state, when the tap operation is performed with respect to photographed image Pi-j, a window 111 with a message telling that the photographed image is saved is displayed as shown in FIG. 10(b). It should be noted that in addition to or in place of the display processing of window 111, a processing of an informing sound, a vibration, a screen effect, or the like, which can be recognized by a user that the photographed image is saved, may be executed.

In such a manner, as shown in FIG. 3(b), a photographed image which is associated with the capturing date is saved in photographed image saving table 13a.

Returning to FIG. 5, control module 11 can delete slide shutter bar B1 (S117) and return the processing to S101. Accordingly, control module 11 can start the successive capturing processing and the preview processing again (S101, S102) and repeat the processing of determining whether or not shutter icon C1, the home key, or the back key is tapped (S103, S104).

As described above, according to one embodiment, a user can readily select a photographed image, which is photographed at a suitable capturing timing, by performing the slide operation with respect to knob B1a of slide shutter bar B1 located on postview screen V2.

According to one embodiment, the photographed image photographed in the successive capturing processing can be saved in photographed image temporary storage table 12a of main storage module 12, so that only the photographed image selected by a user at postview screen V2 can be saved in auxiliary storage module 13. Accordingly, a capacity required in auxiliary storage module 13 can be suppressed. Further, as compared to the conventional successive capturing function, a user can save a time and effort for deleting unnecessary photographed images.

According to one embodiment, the capturing can be started from the time before the tap operation is performed with respect to shutter icon C1. Therefore, a photographed image can be saved which was photographed at a capturing timing before the tap operation was performed with respect to shutter icon C1. A user can obtain a photographed image at a suitable capturing timing even when the user performed the tap operation with respect to shutter icon C1 at a timing delayed from the suitable capturing timing.

According to one embodiment, the capturing can be continued for a predetermined time period after the tap operation was performed with respect to shutter icon C1. Therefore, a photographed image can be saved which was photographed at a capturing timing after the tap operation was performed with respect to shutter icon C1. A user can obtain a photographed image photographed at a suitable capturing timing even when the user performed the tap operation with respect to shutter icon C1 at a timing earlier than the suitable capturing timing.

According to one embodiment, a photographed image, which was photographed immediately after the tap operation was performed with respect to shutter button C1, can be displayed firstly on postview screen V2. Typically, since the suitable capturing timing is not greatly different from the timing at which the user performed the tap operation with respect to shutter icon C1, the user can readily select the suitable photographed image.

According to one embodiment, since slide shutter bar B1 is displayed on postview screen V2, a user can promptly select a photographed image which was photographed before or after the timing at which the tap operation was performed with respect to shutter icon C1.

MODIFIED EXAMPLE 1

In one embodiment described above, slide shutter bar B1 is displayed in a lower portion of postview screen V2.

However, in modified example 1, slide shutter bar B1 is displayed in the right end portion of postview screen V2.

FIGS. 11(a) to 11(d) represent an example of a screen transition of preview screen V1 and postview screen V2 in accordance with modified example 1.

As shown in FIG. 11(a), in modified example 1, a shutter icon C2 is located in the right end portion of preview screen V1. When the tap operation is performed with respect to shutter icon C2, postview screen V2 is displayed as shown in FIG. 11(b). In modified example 1, slide shutter bar B2 is displayed in the right end portion of postview screen V2.

As shown in FIG. 11(c), when the drag operation is performed with respect to knob B2a in a downward direction from a center position, photographed image Pi+j, which was photographed after the tap operation was performed with respect to shutter icon C2, is displayed in display area A2 in accordance with the amount of sliding in the downward direction from the center position.

As shown in FIG. 11(d), when the drag operation was performed with respect to knob B2a in an upward direction from the center position of slide shutter bar B1, photographed image Pi−j, which was photographed before the tap operation was performed with respect to shutter icon C2, is displayed on display area A2 in accordance with the amount of sliding in the upward direction from the center position.

With the configuration of the present modified example, a user can readily select a photographed image photographed at a suitable capturing timing, similarly to one embodiment described above.

With the configuration of the present modified example, since shutter icon C2 and slide shutter bar B2 are located in the right end portions of preview screen V1 and postview screen V2, in a state where mobile phone 1 is held with a right hand while tilting mobile phone 1 in the leftward/rightward direction, the tap operation can be performed with a thumb of the same right hand. Thus, a user can perform the capturing operation with one hand.

It should be noted that, although shutter icon C2 and slide shutter bar B2 are located in the right end portions of preview screen V1 and postview screen V2 in the present modified example, shutter icon C2 and slide shutter bar B2 may be located in the left end portions of preview screen V1 and postview screen V2 or may be located in both left and right end portions of preview screen V1 and postview screen V2. A user may switch shutter icon C2 and slide shutter bar B2 to be located on left or right side of preview screen V1 and postview screen V2 by setting.

MODIFIED EXAMPLE 2

Although shutter icons C1 and C2 are located in preview screen V1 in one embodiment and modified example described above, a hard key having a shutter function may be provided on a side surface of cabinet 2.

FIGS. 12(a) and 12(b) represent screens of mobile phone 1 in accordance with modified example 2.

As shown in FIG. 12(a), in modified example 2, a shutter key 201 is located on the side surface of cabinet 2. For example, shutter key 201 is located at a position on an upper right side of cabinet 2 when mobile phone 1 is tilted in the leftward/rightward direction. In the state where preview screen V1 is displayed, when a user presses shutter key 201, preview screen V2 is displayed as shown in FIG. 12(b). In modified example 2, slide shutter bar B2 is displayed in the right end portion of postview screen V2, similarly to modified example 1.

With the configuration of the present modified example, a user can readily select a photographed image photographed at a suitable capturing timing, similarly to one embodiment described above.

With the configuration of the modified example, in a state where mobile phone 1 is tilted in the leftward/rightward direction and held with a right hand, a user can perform the tap operation with a thumb of the same right hand. A user can operate shutter key 201 with an index finger of a right hand. Thus, a user can perform a capturing operation with one hand.

Although the configuration in which shutter key 201 is located on mobile phone 1 is shown in the present modified example, the present disclosure can be similarly applied to even a digital camera or the like provided with a shutter key. In this case, it may be so configured that a hard key such as a jog dial for a display selection of a photographed image is further located in place of a touch panel, and a user can select the most suitable photographed image in accordance with an operation to the hard key.

MODIFIED EXAMPLE 3

In one embodiment and modified examples described above, a photographed image is selected by performing the drag operation with respect to knob B1a, B2a of slide shutter bars B1, B2. However, in modified example 3, a photographed image is selected in accordance with a leftward/rightward slide operation with respect to displayed photographed images.

FIGS. 13(a) to 13(d) represent a screen transition of postview screen V2 in accordance with modified example 3.

When the tap operation is performed with respect to shutter icon C1 in preview screen V1, photographed image P1 is displayed in display area A2 of postview screen V2 as shown in FIG. 13(a). In postview screen V2, arrow icons C11, C12 are located which indicate that photographed images are present in the leftward/rightward direction.

When a user performs the rightward slide operation with respect to photographed image Pi as shown in FIG. 13(a), photographed image Pi−j, which was photographed before the tap operation was performed, is displayed in display area A2 as shown in FIG. 13(b).

When a user performs the leftward slide operation with respect to photographed image Pi as shown in FIG. 13(c), photographed image Pi+j, which was photographed after the tap operation was performed with respect to shutter icon C1, is displayed in display area A2 as shown in FIG. 13(d).

With the configuration of the present modified example, a user can readily select a photographed image which was photographed at a suitable capturing timing, similarly to one embodiment described above.

With the configuration of the present modified example, the most suitable photographed image can be selected by sliding photographed images one after another. When the number of photographed images is small to some extent, a user can readily select the most suitable photographed image.

It should be noted that a photographed image may be selected by the flick operation in addition to or in place of the slide operation. In this case, photographed images are displayed on post view screen V2 in accordance with a length in which a finger has been in contact with display 3 during the flick operation.

MODIFIED EXAMPLE 4

Other than one embodiment and modified examples described above, various configurations may be used for an interface for allowing a user to select a photographed image on postview screen V2.

For example, as shown in FIG. 14(a), frame-by-frame playback icons C21, C22, a starting end icon C23, and a terminating end icon C24 may be located on postview screen V2.

In this case, when the tap operation is performed with respect to frame-by-frame playback icon C21, photographed image Pi−j, which was photographed before the tap operation was performed with respect to shutter icon C1, is displayed in display area A2. When the tap operation was performed with respect to frame-by-frame playback icon C22, photographed image Pi+j, which was photographed after the tap operation was performed with respect to shutter icon C1, is displayed in display area A2.

When the tap operation is performed with respect to starting end icon C23, oldest photographed image Ps, which was photographed before the tap operation was performed with respect to shutter icon C1, is displayed in display area A2. When the tap operation is performed with respect to terminating end icon C24, newest photographed image Pe, which was photographed after the tap operation was performed with respect to shutter icon C1, is displayed in display area A2.

With the configuration of the present modified example, a user can readily select a photographed image which was photographed at a suitable capturing timing, similarly to one embodiment described above.

The configuration of the present modified example may be combined with the configurations of one embodiment and modified examples 1 to 3 described above.

Further, as shown in FIG. 14(b), a plurality of photographed images may be displayed in display area A2 of postview screen V2, and the most suitable photographed image may be selected from a plurality of photographed images. All the photographed images may be reduced and displayed in display area A2, or photographed images may be located in a plurality of screens in the upward/downward direction or leftward/rightward direction.

With the configuration of the modified example, a user can readily select a photographed image photographed at a suitable capturing timing, similarly to one embodiment described above.

OTHER MODIFIED EXAMPLE

While one embodiment and modified examples were described above, the present disclosure is not limited to one embodiment and the like described above, and one embodiment can also be modified in various manners to have configurations other than those described above.

For example, in one embodiment and modified examples described above, the one most suitable photographed image is selected from a plurality of photographed images photographed successively. However, any number of photographed images may be selected, and a plurality of photographed images may be saved in photographed image saving table 13a.

With such a configuration, a user can readily select a plurality of photographed images photographed at suitable capturing timings and save the same.

In one embodiment and modified examples described above, photographed image Pi, which was photographed immediately after the tap operation was performed with respect to shutter icon C1, is firstly displayed on postview screen V2. However, photographed image Pi−1, which was photographed immediately before the tap operation was performed with respect to shutter icon C1, may be displayed. Further, newest photographed image Pe, which was photographed after the tap operation was performed with respect to shutter icon C1, may be displayed, or oldest photographed image Ps, which was photographed before the tap operation was performed with respect to shutter icon C1, may be displayed.

It should be noted that, since a user generally performs the tap operation with respect to shutter icon C1 while aiming at a suitable capturing timing, the suitable capturing timing is not greatly different from the timing at which the tap operation is performed by a user with respect to shutter icon C1. Thus, it is desirable that the photographed image to be initially displayed on postview screen V2 is a photographed image, which was photographed at a capturing timing close to a capturing timing at which a user performed the tap operation with respect to shutter icon C1, among photographed image Pi, which was photographed immediately after the tap operation was performed with respect to shutter icon C1, and photographed image Pi−1, which was photographed immediately before the tap operation was performed with respect to shutter icon C1.

In one embodiment and modified examples described above, only the capturing control processing of performing the successive capturing processing is executed. However, the capturing control processing of capturing a single shot still image may be executed. In this case, the conventional capturing control processing and the capturing control processing in accordance with one embodiment may be switched by a menu or the like displayed on preview screen V1. Alternatively, a dedicated icon for the capturing control processing in accordance with one embodiment and a dedicated icon for the conventional capturing control processing may be located on the home screen.

In one embodiment described above, the CMOS image sensor is used as an image sensor for camera 8. In place of this, a CCD image sensor may be used. However, in one embodiment, since it would be necessary to photograph high resolution images successively, and the CMOS sensor is superior in the power consumption and high-speed responsiveness as compared to the CCD image sensor, it is desirable to use the CMOS image sensor as is used in one embodiment.

In one embodiment described above, photographed images, which were photographed at 30 fps within 1 second before and after the tap operation with respect to shutter icon C1, are accumulated in photographed image temporary storage table 12a. However, the number and interval of photographed images accumulated in photographed image temporary storage table 12a are not limited to those. The number of photographed images and the interval of capturing may be changed to appropriate parameters in accordance with a capacity of main storage module 12 and a processing performance of control module 11. For example, as a capacity of main storage module 12 becomes larger, the number of photographed images to be saved can be increased, and the most suitable photographed image can be selected from a long time capturing timing.

Photographed image temporary storage table 12a is provided in main storage module 12. However, photographed image temporary storage table 12a may be provided in auxiliary storage module 13 as long as auxiliary storage module 13 can respond in a high speed, and a processing of saving successively photographed images can be performed. Photographed image saving table 13a is provided in auxiliary storage module 13. However, photographed image saving table 13a may be provided in main storage module 12 as long as a retainable region is secured in main storage module 12.

Photographed image Pn displayed on postview screen V2 is used which has a higher resolution than photographed image L1 displayed on preview screen V1. However, the configuration is not limited to this. A resolution of photographed image Pn may be equal to that of photographed image L1 in accordance with a performance of each hardware.

The present disclosure can be applied not only to a mobile phone but also to various mobile terminal devices such as a PDA (Personal Digital Assistant), a tablet PC, an electronic book terminal, and the like having a camera. Further, it is also applicable to an image capturing apparatus such as a digital camera.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. An image capturing apparatus, comprising:
a display;
a camera configured to successively capture images at a predetermined time interval;
at least one memory; and
at least one processor configured to,
  even before a shutter operation is performed, control the camera to successively capture a first set of images at the predetermined interval, and temporarily store the first set of images in the at least one memory, and,
  after the shutter operation is performed,
    control the camera to successively capture a second set of images at the predetermined interval, and temporarily store the second set of images in the at least one memory,
    control the display to display a selection screen for allowing a user to select at least one image from a combined set of images comprising both the first set of images and the second set of images,
    store the selected at least one image in the at least one memory, and
    delete all unselected images in the combined set of images from the at least one memory.

2. The image capturing apparatus according to claim 1, wherein the at least one processor is configured to control the camera to:
  before the shutter operation is performed, temporarily store, at most, a number of images, representing a predetermined time period, as the first set of images, and,
  after the shutter operation is performed, temporarily store the same number of images, representing the same predetermined time period, as the second set of images.

3. The image capturing apparatus according to claim 1, wherein the at least one processor is configured to control the display to shift between images, from the combined set of images, included in the selection screen in accordance with a user operation.

4. The image capturing apparatus according to claim 3, wherein the display is a touch panel display, and wherein the user operation is a touch operation on the touch panel display.

5. The image capturing apparatus according to claim 4, wherein the touch operation is a slide operation comprising a moving continuous touch, and wherein the at least one processor is configured to shift between images, from the combined set of images, included in the selection screen in accordance with a movement amount of the continuous touch.

6. An image capturing apparatus comprising:
a display module;
a capturing module configured to capture successively first images at a predetermined time interval;
an operation receiving module configured to receive an operation;
a first storage module and a second storage module; and
at least one processor configured to
  store temporarily the first images in the first storage module,
  cause the display module to display a selection screen for allowing a user to select one of the first images when the operation receiving module receives a first operation, and
  store the one of the first images in the second storage module when the operation receiving module receives an operation to select the one of the first images
wherein the capturing module is configured to continue to capture successively the first images at the predetermined time interval, until a predetermined time period elapses after the first operation is performed,
wherein the at least one processor is configured to cause the display module to display the selection screen including an image of the first images, and
wherein the at least one processor is configured to cause the display module to display an initial screen of the selection screen, the initial screen including an image captured at time point which is closest to a time point at which the first operation is performed among the first images.

7. The image capturing apparatus according to claim 6, wherein, in accordance with a slide operation on the selection screen, one of the first images is displayed in full size successively and continuously in an order of capturing timing.

8. The image capturing apparatus comprising:
a display module;
a capturing module configured to capture successively first images at a predetermined time interval;
an operation receiving module configured to receive an operation;
a first storage module and a second storage module; and
at least one processor configured to
  store temporarily the first images in the first storage module,
  cause the display module to display a selection screen for allowing a user to select one of the first images when the operation receiving module receives a first operation, and
  store the one of the first images in the second storage module when the operation receiving module receives an operation to select the one of the first images, wherein the at least one processor is configured to shift the image included in the selection screen in accordance with a second operation received by the operation receiving module, wherein the operation receiving module includes a touch detection module configured to detect a touch operation with respect to the display module, wherein the at least one processor is configured to cause the display module to display the selection screen including a first operation object for selecting the one of the first images, and shift the image included in the selection screen in accordance with the touch operation on the first operation object, wherein the capturing module is configured to capture successively second images which are different from the first images, wherein the at least one processor is configured to cause the display module to display a reference screen including one of the second images, the one of the second images being updated at a time interval, the reference screen including a second operation object, and wherein the operation receiving module is configured to receive the touch operation on the second operation object as the first operation.

9. A control method for an image capturing apparatus comprising:

even before a shutter operation is performed, successively capturing a first set of images at a predetermined time interval, and temporarily storing the first set of images in at least one memory; and, after the shutter operation is performed,
successively capturing a second set of images at the predetermined interval, and temporarily storing the second set of images in the at least one memory, displaying a selection screen for allowing a user to select at least one image from a combined set of images comprising both the first set of images and the second set of images, storing the selected at least one image in the at least one memory, and deleting all unselected images in the combined set of images from the at least one memory.

* * * * *